United States Patent
Hu et al.

(10) Patent No.: US 11,086,456 B2
(45) Date of Patent: Aug. 10, 2021

(54) TOUCH MODULE AND TOUCH DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Hongbo Hu, Hubei (CN); Yuan Zheng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/768,986

(22) PCT Filed: Feb. 13, 2020

(86) PCT No.: PCT/CN2020/075043
§ 371 (c)(1),
(2) Date: Jun. 2, 2020

(65) Prior Publication Data
US 2021/0181872 A1 Jun. 17, 2021

(30) Foreign Application Priority Data
Dec. 12, 2019 (CN) .......................... 201911277734.3

(51) Int. Cl.
*G06F 3/041* (2006.01)
*G06F 3/044* (2006.01)
*G06F 1/16* (2006.01)

(52) U.S. Cl.
CPC ............ *G06F 3/044* (2013.01); *G06F 1/1605* (2013.01); *G06F 3/041* (2013.01)

(58) Field of Classification Search
CPC ...... G06F 1/1605; G06F 1/1686; G06F 3/041; G06F 3/0412; G06F 3/04164;
(Continued)

(56) References Cited

U.S. PATENT DOCUMENTS

2012/0268402 A1* 10/2012 Wang .................... G06F 3/0446
345/173
2014/0132569 A1* 5/2014 Lien ...................... G06F 3/0443
345/175
(Continued)

FOREIGN PATENT DOCUMENTS

CN 106873835 A 6/2017
CN 108885376 A 11/2018
(Continued)

*Primary Examiner* — Michael J Eurice

(57) ABSTRACT

The present invention provides a touch module placed on a display panel. The display panel includes a display region and a light-transmissive region. The touch module includes: a first insulating layer and multiple first touch sensing wirings. The first insulating layer includes a first region facing the display region and a second region facing the light-transmissive region. The second region includes multiple second sub-regions arranged in an array and a light-transmissive sub-region arranged between any adjacent four second sub-regions. Each of the first touch sensing wirings is formed in a corresponding one of the second sub-regions. The first touch sensing wirings of any two adjacent second sub-regions are electrically connected through a first connection line.

10 Claims, 2 Drawing Sheets

(58) Field of Classification Search
CPC ...... G06F 3/044; G06F 3/0443; G06F 3/0445; G06F 3/0446; G06F 3/0448; G06F 2203/04103; G06F 2203/04111; G06F 2203/04112; H01L 27/323; H01L 27/3258; H01L 27/3276; H01L 51/5225; H01L 51/56; H01L 2227/323; H01L 2251/5338
See application file for complete search history.

(56) References Cited

U.S. PATENT DOCUMENTS

| | | | |
|---|---|---|---|
| 2016/0204150 A1* | 7/2016 | Oh | H01L 27/14638 |
| | | | 257/229 |
| 2017/0131818 A1* | 5/2017 | Chang | G06F 3/0445 |
| 2018/0373377 A1 | 12/2018 | Ye | |
| 2019/0148680 A1 | 5/2019 | Xin et al. | |
| 2020/0117034 A1 | 4/2020 | Yin et al. | |
| 2020/0225828 A1* | 7/2020 | Jeong | G06F 1/1643 |
| 2020/0401273 A1* | 12/2020 | Bang | H01L 27/3244 |

FOREIGN PATENT DOCUMENTS

| | | |
|---|---|---|
| CN | 109656049 A | 4/2019 |
| CN | 110310977 A | 10/2019 |
| CN | 110489009 A | 11/2019 |
| CN | 110489012 A | 11/2019 |
| CN | 110491909 A | 11/2019 |
| CN | 110491917 A | 11/2019 |

* cited by examiner

TOUCH MODULE AND TOUCH DISPLAY PANEL

FIELD AND BACKGROUND OF THE INVENTION

The present invention relates to a field of display technology and in particular, to a touch module and a touch display panel.

DESCRIPTION OF RELATED ART

With the development of technology, displays are extensively used in daily life. From small wearable devices to outdoor billboards, displays have become an indispensable part. Especially, the most commonly used mobile phones are equipped with displays with high resolution, wide color gamut, and reliable performance. Among many display technologies, AMOLED display panels have gradually become a new generation of display technologies due to high contrast ratios, wide color gamut, low power consumption, and being foldable. As people keep upgrading mobile phones, they started to focus on full screen and flexible screen mobile phones after pursuing large-sized ones with high PPI (pixels per inch).

Nowadays, "full screen" has become the mainstream design of mobile phones. In order to increase a screen ratio, mobile phone manufacturers have successively launched ultra-narrow bezels, notched screens, and hole-digging screens. CUP (camera under panel) technology starts to appear on the market as a new idea. It puts a front camera in a screen, the screen on the camera can display images normally, and at the same time, the camera can also image through the screen. This design can significantly increase the screen ratio of the mobile phone without affecting the aesthetics of the mobile phone.

Light transmittance in a CUP region is an important indicator. Especially for display panels integrated with touch functions, it is an important issue to ensure that the panel can display normally and that the DOT can work normally without decreasing the light transmittance in the CUP region.

SUMMARY OF THE INVENTION

It is an objective of the present invention to provide a touch module and a touch display panel which can reduce or eliminate signal attenuation in a CUP region.

The present invention provides a touch module, disposed on a display panel which comprises a display region and a light-transmissive region, the touch module comprising:

a first insulating layer, the first insulating layer comprising a first region facing the display region and a second region facing the light-transmissive region, wherein the second region comprises a plurality of second sub-regions arranged in an array and a light-transmissive sub-region disposed between any adjacent four second sub-regions; and a plurality of first touch sensing wirings, wherein each of the first touch sensing wirings is formed in a corresponding one of the second sub-regions, and the first touch sensing wirings of any two adjacent second sub-regions are electrically connected through a first connection line.

The touch module of the present invention further comprises a plurality of second touch sensing wirings, the second touch sensing wirings are uniformly distributed in the first region, and a wiring density of the first touch sensing wiring is lower than a wiring density of the second touch sensing wiring.

The touch module of the present invention comprises a first metal layer disposed on an upper surface of the first insulating layer, and a second metal layer disposed on a lower surface of the first insulating layer, wherein the first touch sensing wiring comprises a plurality of first metal lines and a plurality of second metal lines that are criss-crossed with each other, the first metal layer forms the first metal lines, and the second metal layer forms the second metal lines.

In the touch module of the present invention, the second touch sensing wirings comprise a plurality of third metal lines and a plurality of fourth metal lines that are criss-crossed with each other, the first metal layer forms the third metal lines in the first region, and the second metal layer forms the fourth metal lines in the first region.

The touch module of the present invention comprises a first metal layer disposed on an upper surface of the first insulating layer, and a second metal layer disposed on a lower surface of the first insulating layer, wherein the first touch sensing wirings comprise a plurality of first metal lines and a plurality of second metal lines that are criss-crossed with each other, the first metal layer forms the first metal lines and the second metal lines that are criss-crossed with each other, the first metal lines are disconnected at positions where the first metal lines intersect the second metal lines, and the second metal layer forms a plurality of second connection lines for electrically connecting the first metal lines at the disconnected positions.

In the touch module of the present invention, the insulating layer is provided with a first metallization hole, and the first metallization hole electrically connects the second connection line to two ends of a disconnection opening of the first metal line.

In the touch module of the present invention, the second touch sensing wirings comprise a plurality of third metal lines and a plurality of fourth metal lines that are criss-crossed with each other, the first metal layer forms the third metal lines and the fourth metal lines that are criss-crossed with each other, the third metal lines are disconnected at positions where the third metal lines intersect the fourth metal line, and the second metal layer forms the third connection lines for electrically connecting the third metal lines at the disconnected positions.

In the touch module of the present invention, the second sub-regions are arrayed along a diamond shape, and the light-transmissive sub-region is arranged at a center of the diamond shape.

In the touch module of the present invention, the first touch sensing wirings form a plurality of first touch sensing capacitances in the second region, the second touch sensing wirings form a plurality of second touch sensing capacitances in the first region, and a capacitance ratio of the first touch capacitance to the second touch capacitance is in a range of 75% to 133%.

The present invention further provides a touch display panel, comprising a display panel and a touch module disposed on an upper surface of the display panel, wherein the touch module is the touch module mentioned above.

It is an objective of the present invention to provide a touch module and a touch display panel which can reduce or eliminate signal attenuation in a camera under panel (CUP) region.

BRIEF DESCRIPTION OF THE SEVERAL VIEW OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF SPECIFIC EMBODIMENTS OF THE INVENTION

Figure 1:
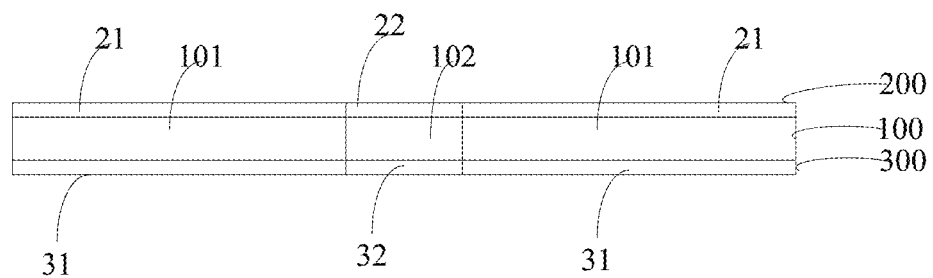
FIG. 1 is a cross-sectional structural view illustrating a touch module according to one embodiment of the present invention.

The structural and functional details disclosed herein are merely illustrative for describing the present invention with reference to its example embodiments. The present invention may, however, be embodied in many alternative forms and should not be construed as being limited to the embodiments set forth herein.

In the present disclosure, terms, such as "center", "horizontal", "upper", "lower", "left", "right", "vertical", "horizontal", "top", "bottom", "inside", and "outside", are based on the orientation or positional relationship shown in the drawings, and are only for the convenience of describing the present invention and simplifying the description. The directional terms do not indicate or imply that the device or element referred to must have a specific orientation or be constructed or operated in a specific orientation. Therefore, the directional terms cannot be understood as a limitation on the present invention. In addition, the terms "first" and "second" are used for illustrative purposes only, and cannot be understood as indicating or implying relative importance or implicitly indicating the number of technical features indicated. Therefore, the features defined as "first" and "second" may explicitly or implicitly include one or more of the features. In the description of the present invention, "multiple" means two or more, unless specifically defined otherwise. In addition, the term "including" and any variations thereof are intended to cover non-exclusive inclusion.

In the description of the present invention, it should be noted that the terms "mounted", "connected", and "coupled" should be understood in a broad sense unless otherwise specified and defined. For example, it can be a fixed connection, a detachable connection, or an integral connection; it can be a mechanical connection or an electrical connection, or two elements can be directly connected to each other or can be indirectly connected through an intermediate medium, or they are connected internally. For those of ordinary skill in the art, the specific meanings of the above terms in the present invention can be understood on a case-by-case basis.

The wording used herein is for the purpose of describing particular embodiments only and is not intended to limit the example embodiments. Unless the context clearly indicates otherwise, the singular forms "a" and "an" are intended to include the plural forms. It should also be understood that the terms "including" and/or "comprising" specify the presence of stated features, integers, steps, operations, units and/or components without precluding the presence or addition of one or more other features, integers, steps, operations, units, components, and/or combinations thereof.

The present invention provides a touch module, disposed on a display panel which comprises a display region and a light-transmissive region, the touch module comprising:

a first insulating layer, the first insulating layer comprising a first region facing the display region and a second region facing the light-transmissive region, wherein the second region comprises a plurality of second sub-regions arranged in an array and a light-transmissive sub-region disposed between any adjacent four second sub-regions; and a plurality of first touch sensing wirings, wherein each of the first touch sensing wirings is formed in a corresponding one of the second sub-regions, and the first touch sensing wirings of any two adjacent second sub-regions are electrically connected through a first connection line.

Figure 2:
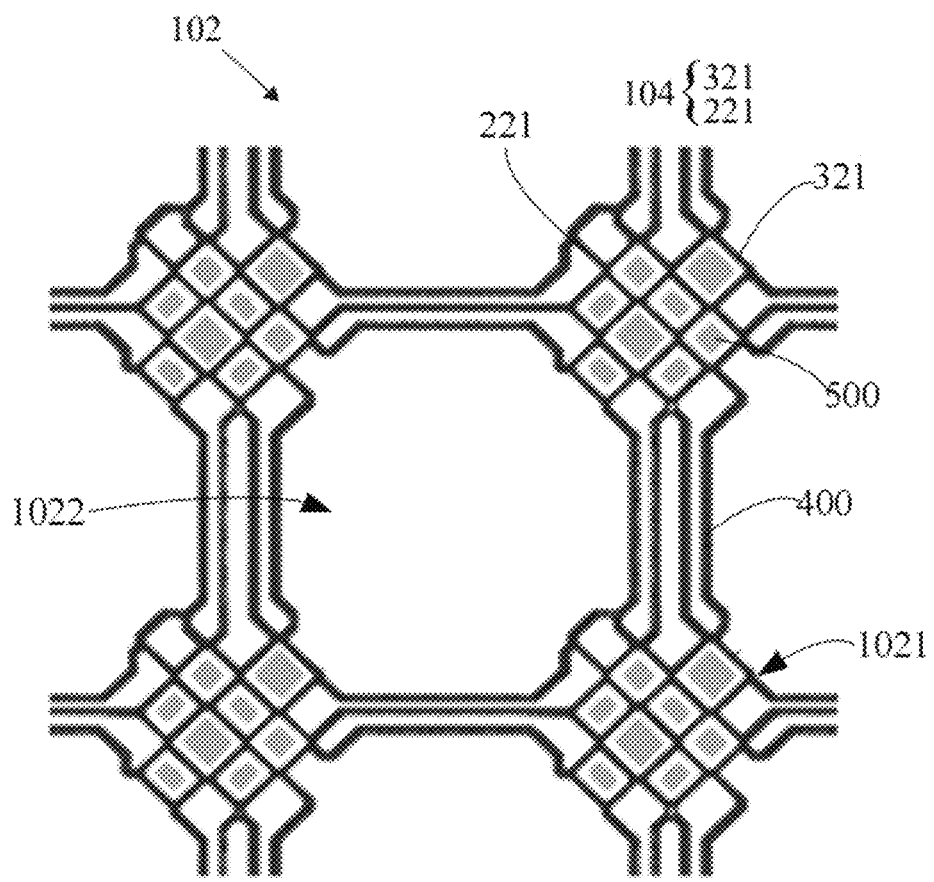
FIG. 2 is a first plan view illustrating the touch module according to one embodiment of the present invention.

Please refer to FIGS. 1 and 2. In some embodiments, the touch module comprises: a first insulating layer 100, a first metal layer 200, and a second metal layer 300.

The first insulating layer 100 comprises a first region 101 facing the display region 31 and a second region 102 facing the light-transmissive region 32, wherein the second region 102 comprises a plurality of second sub-regions 1021 arranged in an array and a light-transmissive sub-region 1022 disposed between any adjacent four second sub-regions 1021. The light-transmissive region 32 is corresponding to sensors such as a front camera or a camera under panel (CUP). The light-transmissive region 32 comprises touch sensing units (i.e., transmitting electrodes (Tx) and receiving electrodes (Rx)) for normal touch operations.

The touch module comprises a plurality of first touch sensing wirings 104 and a plurality of second touch sensing wirings (not illustrated). Each of the first touch sensing wirings 104 is formed in a corresponding one of the second sub-regions 1021, and the first touch sensing wirings 104 of any two adjacent second sub-regions 1021 are electrically connected through a first connection line 400. The second touch sensing wirings are uniformly distributed in the first region 101, and a wiring density of each of the first touch sensing wirings 104 is less than a wiring density of each of the second touch sensing wirings. The light-transmissive sub-regions 1022 are in the second region 102, and the wiring density of each of the first touch sensing wirings 104 is less than the wiring density of each of the second touch sensing wirings.

In detail, according to the present embodiment, the first touch sensing wiring comprises a plurality of first metal lines 221 and a plurality of second metal lines 321 that are criss-crossed with each other, the first metal layer 200 forms the first metal lines 221, and the second metal layer 300 forms the second metal lines 321.

In detail, according to the present embodiment, the second touch sensing wirings comprise a plurality of third metal lines and a plurality of fourth metal lines that are criss-crossed with each other, the first metal layer forms the third metal lines in the first region, and the second metal layer forms the fourth metal lines in the first region.

According to some embodiments, the second sub-regions 1021 are arrayed along a diamond shape, and the light-transmissive sub-region 1022 is arranged at a center of the diamond shape. The first touch sensing wirings form a plurality of first touch sensing capacitances in the second region, the second touch sensing wirings form a plurality of second touch sensing capacitances in the first region, and a capacitance ratio of the first touch capacitance to the second touch capacitance is in a range of 75% to 133%.

The first metal line 221 and the third metal lines are both Tx (transmit) metal lines, and the second metal line 321 and the fourth metal line are Rx (receive) metal line. A line width critical dimension (CD) of the first metal line 221 and a line width CD of the second metal line 321 are consistent with a line width CD of the third metal line and a line width CD of the fourth metal line. No opening is provided between the first metal line 221 and the second metal line 321, and the first touch sensing wiring is distributed between two adjacent light-emitting units 500, that is, between two adjacent pixel openings defined by a pixel definition layer (PDL), and the light-emitting units 500 are disposed in the pixel openings. The first touch sensing wiring can coincide with a switch array wiring in the display panel, and a blank area between the first touch sensing wirings is the light-transmissive sub-region 1022. Because a wiring density of the first touch sensing wiring in the second region 102 decreases, electrical resistance increases. In order to reduce the influence of an IR Drop, and also to increase a capacitance between the Tx and Rx metal lines in the second region 102, line widths of the Tx and Rx metal lines are partially widened. As shown in FIG. 2, a line width CD of the first connection line 400 can be 1.8 times a line width CD of the first touch sensing wiring. It should be noted that the increase in a line width of the first connection line 400 in the present embodiment is calculated based on balancing resistances of the touch sensing wirings in the second region 102 and the first region 101. According to different specifications of pixels and touch lines for panels, the increase in the line width of the first connection line 400 can be different. Therefore, the present embodiment is not intended to limit the increase in the line width CD of the first connection line 400.

In alternative embodiments, the first metal line, the second metal line, the third metal line, and the fourth metal line are all disposed on an upper surface of the first insulating layer. In detail, the first metal layer forms the first metal lines and the second metal lines which are criss-crossed with each other, and the first metal lines are disconnected at positions where the first metal lines intersect the second metal lines. The second metal layer forms a plurality of second connection lines for connecting the first metal lines at the disconnected positions. The first metal layer forms the third metal lines and the fourth metal lines which are criss-crossed with each other, and the third metal lines are disconnected at positions where the third metal lines intersect the fourth metal lines. The second metal layer forms a plurality of third connection lines for electrically connecting the third metal lines at the disconnected positions.

Figure 3:
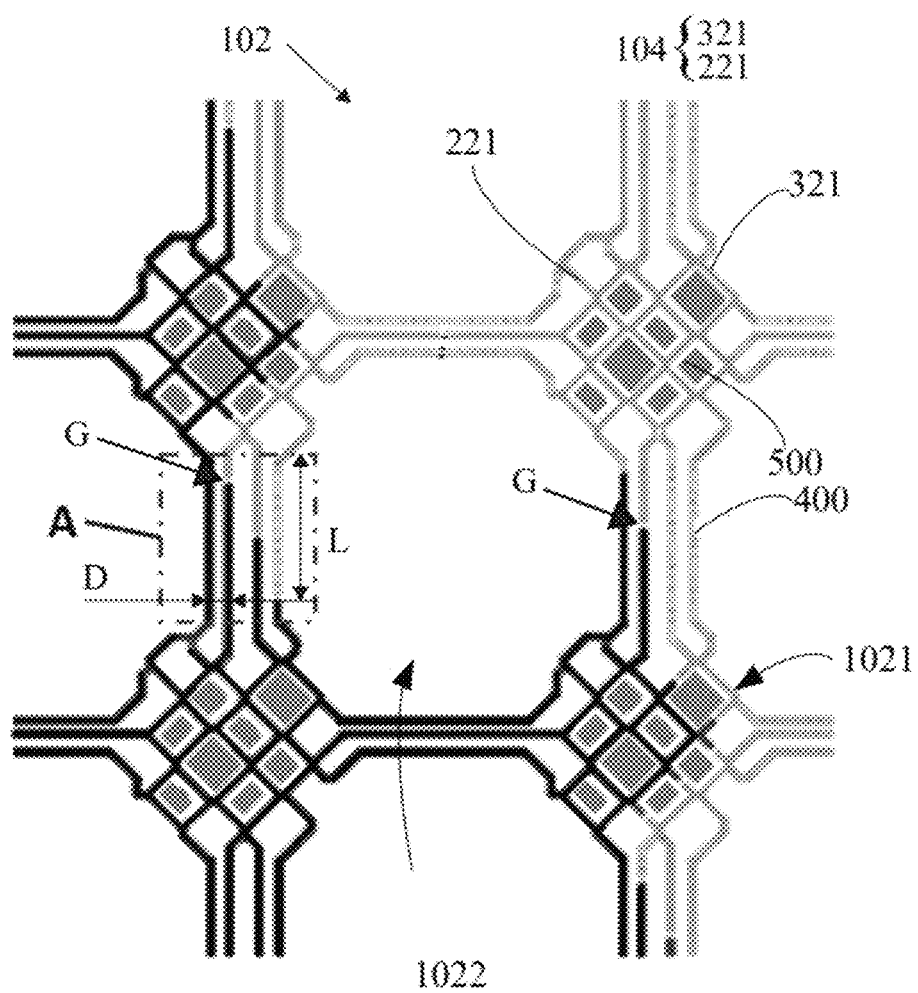
FIG. 3 is a second plan view illustrating the touch module according to one embodiment of the present invention.

As shown in FIG. 3, each of the first touch sensing wirings 104 is arranged between adjacent light-emitting units 500, that is, between adjacent pixel openings defined by the PDL, and the light-emitting units 500 are located in the pixel openings. The first touch sensing wiring 104 can coincide with the switch array wiring in the display panel, and the blank area between the first touch-sensitive wirings 104 is the light-transmissive sub-region 1022. An opening G is defined between the first metal line 221 (a Tx metal line) and the second metal line 321 (an Rx metal line), and each of the first touch sensing wirings 104 works by using a capacitance formed at the opening G between the Tx metal line 221 and the Rx metal line 321. Since the wiring density of the first touch sensing wirings 104 in the second region 102 is reduced, it easily causes the capacitances, between the first metal line 221 and the second metal line 321 of the first touch sensing wirings 104 in the second region 102, much lower than the capacitances between the third metal lines and the fourth metal lines (i.e., Tx metal lines and Rx metal lines) of the second touch sensing wirings in the first region 101. As a result, touch control performance is affected. In order to increase the capacitances between the adjacent first metal lines 221 and second metal lines 321 in the second region 102, the present invention extends overlapping regions of the first metal lines 221 and the second metal lines 321 in the second region 102 (i.e., a camera under panel region, or a CUP region for short). As shown by an area A marked by a dashed frame in FIG. 3, in addition to having the opening G at ends of the first metal line 221 and the second metal line 321, the present embodiment also increases a parallel wiring area of each of the first connection lines 400. By adjusting a length L and a spacing D of the parallel wring area, the capacitances between the first metal lines 221 and the second meal lines 321 in the second region 102 are substantially the same as the capacitances in the first region 101, thereby ensuring that touch functions of the second region 102 (i.e., the CUP region) work well.

Figure 4:
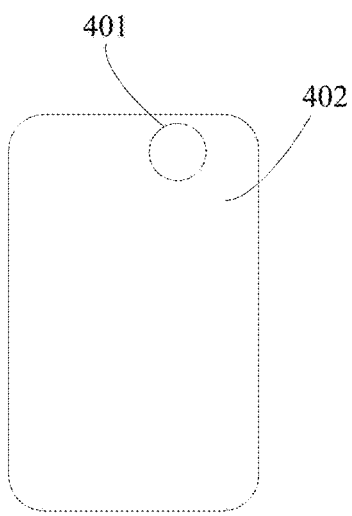
FIG. 4 is a plan view illustrating a touch display panel according to one embodiment of the present invention.

The present invention further provides a touch display panel. The touch display panel comprises a display panel and a touch module disposed on an upper surface of the display panel. The touch module is the touch module of any of the above embodiments. As shown in FIG. 4, the touch display panel comprises a display region 401 and a light-transmissive region 402. The display region 401 does not have a fixed position and a particular shape. The light-transmissive region 402 is for placing sensors such as a front camera. The light-transmissive region 402 comprises a light-emitting unit and a touch sensing unit for normal touch operations. After the camera is turned off, the light-transmissive region 402 can display images normally. The display panel may be an active-matrix organic light emitting diode (AMOLED) display panel, which includes a glass substrate, a flexible substrate, a switch array layer (array layer), an organic light-emitting display layer (EL layer), and thin-film encapsulation layer (TFE layer) from bottom to top. The Array layer comprises all the film layers that constitute circuits that drive an organic light emitting diode (OLED) to emit light. The EL layer mainly comprises an anode, an electron injection layer, an electron transport layer, a light emitting layer, a hole transport layer, a hole injection layer, a cathode, and etc.

The present invention is described in detail above. Specific examples are provided to explain the working principles and embodiments of the present invention. The descriptions of the above embodiments are only for ease of understanding of the present invention. Those skilled in the art can modify the embodiments and change their use based on the idea of the present invention. In summary, the content of this specification should not be construed as a limitation on the present invention.

What is claimed is:

1. A touch module, disposed on a display panel comprising a display region and a light-transmissive region, the touch module comprising:

a first insulating layer comprising a first region facing the display region and a second region facing the light-transmissive region, wherein the second region comprises a plurality of second sub-regions arranged in an array and a light-transmissive sub-region disposed between any adjacent four second sub-regions, the second sub-regions are arrayed along a diamond shape, and the light-transmissive sub-region is arranged at a center of the diamond shape; and a plurality of first touch sensing wirings, wherein each of the first touch sensing wirings is formed in a corresponding one of the second sub-regions, and the first touch sensing wirings of any two adjacent second sub-regions are electrically connected through a first connection line;

wherein the touch module further comprises a plurality of second touch sensing wirings, the second touch sensing wirings are uniformly distributed in the first region, and a wiring density of each of the first touch sensing wirings is lower than a wiring density of each of the second touch sensing wirings; and wherein each of the first touch sensing wirings comprises a plurality of first metal lines and a plurality of second metal lines that are criss-crossed with each other, and each of the second touch sensing wirings comprises a plurality of third metal lines and a plurality of fourth metal lines that are criss-crossed with each other, the first touch sensing wirings form a plurality of first touch sensing capacitances in the second region, the second touch sensing wirings form a plurality of second touch sensing capacitances in the first region, and a length and a spacing of a parallel wiring area of each of the first connection lines are arranged such that a capacitance ratio of the first touch capacitance to the second touch capacitance is in a range of 75% to 133%.

2. The touch module according to claim 1, further comprising a first metal layer disposed on an upper surface of the first insulating layer, and a second metal layer disposed on a lower surface of the first insulating layer, wherein the first metal layer forms the first metal lines, and the second metal layer forms the second metal lines.

3. The touch module according to claim 2, wherein the first metal layer forms the third metal lines in the first region, and the second metal layer forms the fourth metal lines in the first region.

4. The touch module according to claim 2, the first metal layer forms the first metal lines and the second metal lines that are criss-crossed with each other, the first metal lines are disconnected at positions where the first metal lines intersect the second metal lines, and the second metal layer forms a plurality of second connection lines for electrically connecting the first metal lines at the disconnected positions.

5. The touch module according to claim 4, wherein the first insulating layer is provided with a first metallization hole, and the first metallization hole electrically connects the second connection line to two ends of a disconnection opening of the first metal line.

6. The touch module according to claim 4, wherein the first metal layer forms the third metal lines and the fourth metal lines that are criss-crossed with each other, the third metal lines are disconnected at positions where the third metal lines intersect the fourth metal line, and the second metal layer forms the third connection lines for electrically connecting the third metal lines at the disconnected positions.

7. A touch display panel, comprising a display panel and a touch module disposed on an upper surface of the display panel, wherein the display panel comprises a display region and a light-transmissive region, and the touch module comprises:

a first insulating layer comprising a first region facing the display region and a second region facing the light-transmissive region, wherein the second region comprises a plurality of second sub-regions arranged in an array and a light-transmissive sub-region disposed between any adjacent four second sub-regions, the second sub-regions are arrayed along a diamond shape, and the light-transmissive sub-region is arranged at a center of the diamond shape; and a plurality of first touch sensing wirings, wherein each of the first touch sensing wirings is formed in a corresponding one of the second sub-regions, and the first touch sensing wirings of any two adjacent second sub-regions are electrically connected through a first connection line;

wherein the touch module further comprises a plurality of second touch sensing wirings, the second touch sensing wirings are uniformly distributed in the first region, and a wiring density of each of the first touch sensing wirings is less than a wiring density of each of the second touch sensing wirings; and wherein each of the first touch sensing wirings comprises a plurality of first metal lines and a plurality of second metal lines that are criss-crossed with each other, and each of the second touch sensing wirings comprises a plurality of third metal lines and a plurality of fourth metal lines that are criss-crossed with each other, the first touch sensing wirings form a plurality of first touch sensing capacitances in the second region, the second touch sensing wirings form a plurality of second touch sensing capacitances in the first region, and a length and a spacing of a parallel wiring area of each of the first connection lines are arranged such that a capacitance ratio of the first touch capacitance to the second touch capacitance is in a range of 75% to 133%.

8. The touch display panel according to claim 7, further comprising a first metal layer disposed on an upper surface of the first insulating layer, and a second metal layer disposed on a lower surface of the first insulating layer, wherein the first metal layer forms the first metal lines, and the second metal layer forms the second metal lines.

9. The touch display panel according to claim 8, wherein the first metal layer forms the third metal lines in the first region, and the second metal layer forms the fourth metal lines in the first region.

10. The touch display panel according to claim 8, wherein the first metal layer forms the first metal lines and the second metal lines that are criss-crossed with each other, the first metal lines are disconnected at positions where the first metal lines intersect the second metal lines, and the second metal layer forms a plurality of second connection lines for electrically connecting the first metal lines at the disconnected positions.

* * * * *